(12) United States Patent
Kim et al.

(10) Patent No.: US 9,758,658 B2
(45) Date of Patent: Sep. 12, 2017

(54) ENHANCED OILFIELD SWELLABLE ELASTOMERS AND METHODS FOR MAKING AND USING SAME

(71) Applicant: WEATHERFORD/LAMB, INC., Houston, TX (US)

(72) Inventors: Byong Jun Kim, Sugar Land, TX (US); Keith Charles Spacey, Manchester (GB); Deborah Lynn Banta, Humble, TX (US); William David Breach, Kingwood, TX (US)

( * ) Notice: Subject to any disclaimer, the term of this patent is extended or adjusted under 35 U.S.C. 154(b) by 0 days.

(21) Appl. No.: 13/645,460

(22) Filed: Oct. 4, 2012

(65) Prior Publication Data
US 2013/0096038 A1  Apr. 18, 2013

Related U.S. Application Data

(60) Provisional application No. 61/544,207, filed on Oct. 6, 2011.

(51) Int. Cl.
| | |
|---|---|
| *E21B 7/26* | (2006.01) |
| *C08L 23/16* | (2006.01) |
| *C08J 3/24* | (2006.01) |
| *C08K 5/14* | (2006.01) |

(52) U.S. Cl.
CPC ............ *C08L 23/16* (2013.01); *C08J 3/243* (2013.01); *C08K 5/14* (2013.01); *C08J 2323/16* (2013.01); *C08J 2333/08* (2013.01)

(58) Field of Classification Search
CPC ...... C09K 2208/00; C09K 8/80; C09K 8/035; C09K 8/588; C09K 8/86; C09K 21/08; C09K 2208/32; C09K 3/00; C09K 3/30; C09K 5/00; C09K 5/045; C09K 8/00; C09K 8/34; C09K 8/532; C09K 8/536; C09K 8/57; C09K 8/5753; C09K 8/60; C09K 8/602; C09K 8/605; C09K 8/62; C09K 8/685; C09K 8/70; C09K 8/805; C09K 8/90; C09K 8/905; E21B 43/162; E21B 43/2406; E21B 19/164; E21B 21/08; E21B 21/16; E21B 28/00; E21B 33/1208; E21B 34/063; E21B 34/16; E21B 41/00; E21B 41/0007; E21B 43/00; E21B 43/013; E21B 43/121
See application file for complete search history.

(56) References Cited

U.S. PATENT DOCUMENTS

| 2007/0027245 A1* | 2/2007 | Vaidya ............... C08C 19/00 524/424 |
| 2009/0137431 A1* | 5/2009 | Reddy ............... C09K 8/5045 507/210 |
| 2010/0314134 A1 | 12/2010 | Nutley et al. |

FOREIGN PATENT DOCUMENTS

| CN | 101698713 A | 4/2010 |
| WO | WO2008/155565 | * 12/2008 |

OTHER PUBLICATIONS http://chemistry.about.com/od/inorganic/a/sinorganic.htm downloaded on Oct. 16, 2014.*
S.K. Henning and R.C. Sartomer, Fundamentals of curing elastomer with peroxides and coagents (Rubber World, 2006, pp. 28-35).*
P. McElfresh, L. Guo, Studies of water swellable NBR for downhole sealing applications, Rubber World, 2008, 41-44.*
Wack et al. "Water-Swellable Materials—Application in Self-Healing Sealing Systems", Proceedings of the First International Conference on Self Healing Materials Apr. 18-20, 2007, Noordwijk aan Zee, The Netherlands.

* cited by examiner

*Primary Examiner* — Kumar R Bhushan
(74) *Attorney, Agent, or Firm* — Robert W Strozier

(57) ABSTRACT

Swellable elastomeric compositions including an elastomer, a covalent crosslinking system and an ionic crosslinking system, where the composition have improved rate of swelling in water, brines and aqueous solutions, swellability, and/or physical properties of the compositions.

13 Claims, 4 Drawing Sheets sodium polyacyrylate poly(acyrlamide-co-acrylic acid) potassium salt

ENHANCED OILFIELD SWELLABLE ELASTOMERS AND METHODS FOR MAKING AND USING SAME

RELATED APPLICATIONS

The present application claims the benefit of and priority to U.S. Provisional Patent Application Ser. No. 61/544,207 filed 6 Oct. 2011.

BACKGROUND OF THE INVENTION

1. Field of the Invention

Embodiments of the present invention relate to new swellable elastomeric compositions comprising a crosslinkable elastomer or a mixture of crosslinkable elastomers, a cure system, a co-cure system and optional ionic additive system, where the elastomeric composition is aqueous swellable and forms a network including covalent and ionic crosslinks.

More particularly, embodiments of the present invention relate to new swellable elastomeric compositions comprising a crosslinkable elastomer or a mixture of crosslinkable elastomers, a cure system, a co-cure system and optional ionic additive system, where the elastomeric composition is aqueous swellable and forms a network including covalent and ionic crosslinks. The compositions are well suited for oilfield applications and other applications using swellable polymeric compositions. The compositions also show improved swelling and physical properties.

2. Description of the Related Art

U.S. Pat. No. 7,373,991 is aware of problems with current swellable elastomeric composition including high amounts of polymeric swelling agent, so called superabsorbent polymer (SAP). U.S. Pat. No. 7,373,991 tries to reduce the use of SAPs in the water-swellable elastomer formulations by reacting a linear or branched polymer having residual ethylenic unsaturation with an ethylenically unsaturated organic monomer having at least one reactive moiety selected from the group consisting of acid, acid anhydride, and acid salt.

While at least one approach to addressing the problem of swellable elastomeric compositing having a high SAP content, there is still a need in the art for other approaches to reduce SAP content and to increase the rate of swelling of swellable elastomeric network compositions and to improve physical properties of the swellable elastomeric network compositions.

SUMMARY OF THE INVENTION

Embodiments of the present invention provide water swellable elastomeric compositions for use in oilfield applications, where the compositions include a crosslinkable elastomer or a mixture of elastomers, a covalent crosslinking system, an ionic crosslinking system and optionally an ionic additive system, where the ionic crosslinking system and the optional ionic additive system produce ionic domains in the resulting networks, the elastomeric compositions are aqueous swellable and networks include covalent and ionic crosslinks. The term "network" means a composition including molecular chains held together by crosslinks between the molecular chains.

Embodiments of the present invention provide water swellable elastomeric compositions for use in oilfield applications, where the compositions include a crosslinkable elastomer or a mixture of elastomers, a primary crosslinking system, a secondary crosslinking system and optionally an ionic additive system, where the secondary crosslinking system and the optional ionic additive system produce ionic domains in the resulting networks, the elastomeric compositions are aqueous swellable and networks include covalent and ionic crosslinks.

Embodiments of the present invention provide water swellable elastomeric compositions for use in oilfield applications, where the compositions include a crosslinkable elastomer or a mixture of elastomers, a crosslinking system, a co-crosslinking system and optionally an ionic additive system, where the co-crosslinking system and the optional ionic additive system produce ionic domains in the resulting networks, the elastomeric compositions are aqueous swellable and networks include covalent and ionic crosslinks. In certain embodiments, the co-crosslinking system includes metal-containing poly-functional organic compounds and the optional ionic additive system includes metal-containing mono-functional organic compounds. In other embodiment, the co-crosslinking system includes metal-containing di-functional organic compounds and metal-containing tri-functional organic compounds and the optional ionic additive system includes metal-containing mono-functional organic compounds. In other embodiments, the co-crosslinking system includes metal-containing di-functional organic compounds and the optional ionic additive system includes metal-containing mono-functional organic compounds.

Embodiments of the present invention provide water swellable elastomeric compositions for use in oilfield applications, where the compositions include a crosslinkable elastomer or mixture or elastomers, a cure system, a co-cure system and optionally an ionic additive system, where the co-cure system and the optional ionic additive system produce ionic domains in the resulting networks, the elastomeric compositions are aqueous swellable and networks include covalent and ionic crosslinks. In certain embodiments, the co-cure system includes metal-containing poly-functional organic compounds and the optional ionic additive system includes metal-containing mono-functional organic compounds. In other embodiment, the co-cure system includes metal-containing di-functional organic compounds and metal-containing tri-functional organic compounds and the optional ionic additive system includes metal-containing mono-functional organic compounds. In other embodiments, the co-cure system includes metal-containing di-functional organic compounds and the optional ionic additive system includes metal-containing mono-functional organic compounds.

An oilfield apparatus comprising a high temperature swellable elastomeric composition comprising an elastomer or a mixture of elastomers, a cure system, a co-cure system and optional ionic additive system, where the co-cure system and the optional ionic additive system produce ionic domains in the resulting networks, the elastomeric compositions are aqueous swellable and networks include covalent and ionic crosslinks. Due to the structures of the polymeric networks of the compositions of this invention, the compositions show improved rate of swelling in water, brines and aqueous solutions, swellability, and/or physical properties of the compositions.

An oilfield assembly for exploring for, drilling for, testing for, or producing hydrocarbons comprising: (a) one or more oilfield apparatus selected from the group consisting of tubing, jointed pipe, sucker rods, electric submersible pumps, submersible pump motor protector bags, packers, packer elements, blow out preventers, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motor heads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof; and (b) one or more of the oilfield apparatus comprising an elastomeric composition comprising an elastomer or a mixture of elastomers, a cure system, a co-cure system and optional ionic additive system, where the co-cure system and the optional ionic additive system produce ionic domains in the resulting networks, the elastomeric compositions are aqueous swellable and networks include covalent and ionic crosslinks.

A method comprising (a) selecting one or more oilfield apparatus having a component comprising an elastomeric composition comprising an elastomer or a mixture of elastomers, a cure system, a co-cure system and optional ionic additive system, where the co-cure system and the optional ionic additive system produce ionic domains in the resulting networks, the elastomeric compositions are aqueous swellable and networks include covalent and ionic crosslinks; and (b) using the one or more oilfield apparatus in an oilfield operation, thus exposing the oilfield apparatus to an oilfield environment. In certain embodiments, the oilfield apparatus is selected from the group consisting of submersible pump motor protector bags, packer elements, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motor heads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
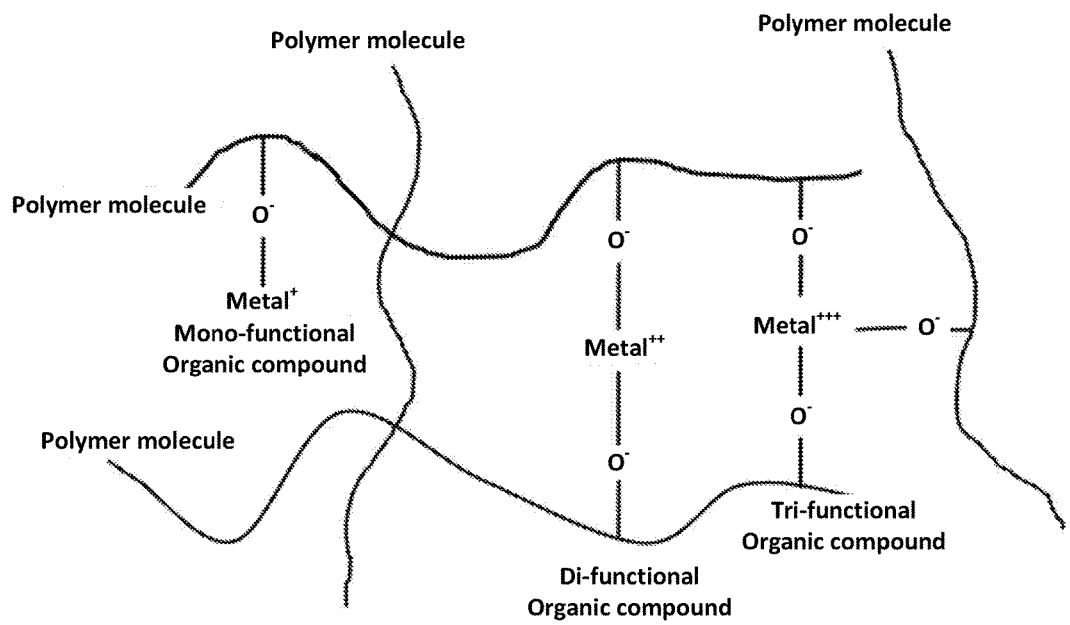
FIG. 1 depicts an embodiment of an elastomeric polymer network composition including ionic bonds.

The inventors have found that new swellable elastomeric network compositions can be constructed that permit the compositions to have enhanced rates of swelling, increased cross-link densities, and improved network physical properties. The inventors have found that by forming ionic domains within the network during curing, the properties of the polymers may be improved and the need for super absorbent polymer (SAP) agents reduced. The inventors have found that the compositions of this invention to produce networks having improved swellability in water, brines or other aqueous solutions, the networks have improved rates of swelling compared to composition excluding the ionic crosslinking system and the networks have improved physical properties.

Embodiments of this invention relate to swellable elastomeric network compositions comprising a covalent crosslinked network, an ionic crosslinked network, optionally ionic pendant groups and optionally super absorbent polymers (SAPs), where the covalent crosslinked network and the ionic crosslinked network provide the compositions with improved physical properties such as tensile stress, elongation, modulus, compression set, tear strength, and to withstand a high differential pressure in harsh downhole environments, while the ionic crosslinks, the optional ionic pendant groups and the optional SAPs provide domains for water swellability without imparting significant stress into the compositions permitting a faster rate of water osmosis into the compositions and swelling of the compositions.

Embodiments of this invention relate to swellable elastomeric network compositions comprising a crosslinked network and interpenetrating ionic domains to form a low stress/strain swellable composition, where the crosslinks comprise covalent and ionic crosslink and the ionic domains comprise the ionic crosslinks, optional ionic pendant groups and optional super absorbent polymers (SAPs), where the crosslinked network provides the compositions with improved physical properties such as tensile stress, elongation, modulus, compression set, tear strength, and to withstand a high differential pressure in harsh downhole environments, while the ionic domains permit improved water swellability without imparting significant stress/strain into the compositions and permit a faster rate of water osmosis into the compositions and swelling of the compositions.

By varying the amount of the cure system and the co-cure system and by varying the temperature and thermal history of the cure conditions, the relative amount of covalent and ionic crosslinking may be varied. Thus, the relative ratio of covalent crosslinks to ionic crosslinks, the crosslink densities and distributions of the covalent crosslinks to ionic crosslinks and the overall crosslink density and distribution may be varied. Such variations permit compositions to be prepared that are optimized for different conditions and environments.

A highly crosslinked water-swellable elastomer cannot highly and/or rapidly swell in contact with water or water-based solution. The highly crosslinked molecular networks keep Superabsorbent Polymer (SAP) and base-elastomer from highly straining, which results from swelling. Therefore, it is a common practice for rubber chemists to design intentionally the swellable elastomers with a low state of cure and/or a large loading of SAP in order to achieve a high swell capability in contact with water or an aqueous solution. However, the low state of cure and high loading of SAPs lead to poor physical and mechanical properties of the swellable elastomers or network. Large loading of SAPs to elastomers results in a deterioration in inherent properties of the rubber, such as tensile stress, elongation, modulus, compression set, and tear strength. Swellable packers, which are made of such elastomers, are, therefore, unable to withstand a high differential pressure in harsh downhole environments.

A cured elastomeric composition comprising: a crosslinkable elastomer or a mixture of crosslinkable elastomers, a cure system, a co-cure system, and an ionic additive system, where the cured elastomeric composition includes covalent and ionic crosslinks and is swellable in water and aqueous brines.

The drawback of blending SAPs and elastomers is that swellable elastomers containing large amount of SAPs do not possess initial, short term, and long term physical integrity. Differential pressure holding capability of swellable packers is limited in the downhole, compared with inflatable packers. This problem with highly water swellable elastomers is known in the oilfield technology service industry.

A SAP-containing elastomer swells in contact with water-based solutions. Most SAPs have the ability to absorb 200-500 times their weight in pure water. SAPs are prepared using various polymers and certain metal compounds, such as sodium and potassium salts. The driving force of water-swelling is osmotic pressure, which is caused by a chemical potential difference between the SAP and the aqueous solution. Therefore, SAPs ability to absorb water is dependent upon the ionic concentration of the aqueous solution.

For oilfield applications, swellable packers are mostly deployed in brine environments or other aqueous environments, rather than in pure water. Such ionic aqueous solutions dramatically reduces the swell capability or swellability or rate of swelling of swellable elastomers or swellable elastomeric networks or matrices.

A historical solution to make water swellable elastomers effective in highly ion-concentrated aqueous solutions is to formulate a network having a low loading of curing agents such as peroxides, sulfur, sulfur donor etc. and high loading of SAPs.

Elastomers become practically useful after crosslinking, (so called curing, networking of molecular chains). Our solution is to formulate water/hybrid swellable elastomers in a way to increase ionic density of the base elastomer during the curing process. In other words, our invention is to incorporate metal ionic groups in the elastomer network during cure. As a result, the ionic potential of swellable elastomers is not only driven by SAP, but also base-elastomer and the cured network. Higher ionic density of the elastomer molecular chain network after curing increases the chemical potential of the base elastomer and the resulting cured network itself so that it will attract water and ion-concentrated aqueous solutions more rapidly with a reduced or minimized loading of SAPs.

Referring now to FIG. 1, an embodiment of a network of this invention is shown with mono-functional linkages, di-functional linkages and tri-functional linkages due to metal ionic bonds. These networks form when metal-containing organic compounds or non-organic (Si BN, Ge or other non-organic) compounds are used as a co-curing agent with traditional cure systems such as a peroxide, sulfur or sulfur donor cure systems. Such co-curing agents may be used alone and/or in combination. Metal-containing organic compounds, which may be used in the present invention are set forth herein.

Similarly, network compositions of this invention may be prepared with using zinc based co-curing agents such as zinc diacrylate (ZDA) and zinc dimethacrylate (ZMA).

Figure 2:
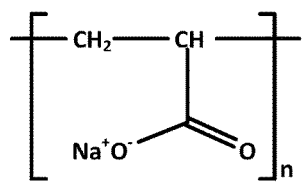
FIG. 2 depicts two super absorbent polymeric (SAP) agents: sodium polyacrylate and poly(acryl amide-co-acrylic acid) potassium salt.
Figure 2:
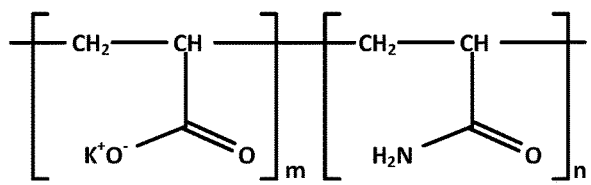

Such ionic crosslinks in the network composition of this invention increase an ionic density of swellable elastomers. These composition may also include super absorbent polymers (SAPs). Widely used SAPs are sodium polyacrylate and poly(acryl amide-co-acrylic acid) potassium salt, which are shown in FIG. 2.

Figure 3:
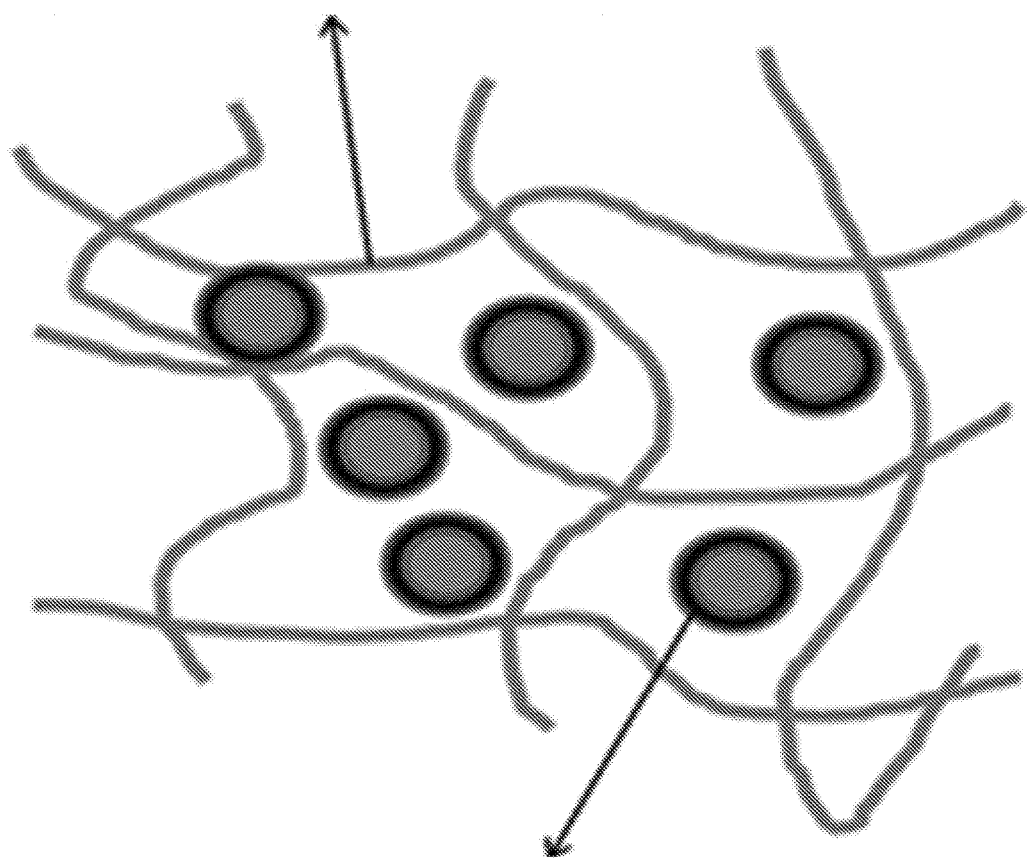
FIG. 3 depicts an embodiment of an elastomeric polymer network composition including SAPs distributed in the network.

The $Na^+$ potential or $K^+$ potential of SAPs are higher than the $H^+$ potentials of water or aqueous solutions so that osmotic pressure is created. As a result, water migrates into the swellable elastomeric compositions until it reaches potential equilibrium. However, SAPs are independent from base-polymer network, i.e. not chemically attached as shown in FIG. 3. It is just physically blended.

Drawbacks to these type of SAP-elastomeric network composition include (1) no chemical compatibility between SAP and elastomer, (2) poor physical properties of the composition after swelling, (3) leach-out of swollen SAP from the elastomeric matrix, and (4) large usage of SAP is required for a practical swell.

We have found a way how to formulate elastomeric or rubber compositions to swell faster and higher in water and aqueous solution than conventionally formulated elastomeric or rubber compositions. We have found that elastomeric compositions including between about 1 (part per hundred rubber (phr) and about 50 phr of a metal-containing organic co-cure agent or mixture or co-cure agents, where the co-cure agents cross-link the elastomer or rubber molecules ionically—ionic bonds. The present composition, thus, are a hybrid cured elastomer network system including covalent and ionic bonds, where the ionic bonds for ionic domains within the elastomeric network improve the swell capability of the elastomers. In fact, the ionic domains due to the ionic co-curing agents significantly enhance a rate of swelling, the swellability and improve the physical properties of the networks. In certain embodiment, the elastomeric compositions including between about 1 phr and about 40 phr of a metal-containing organic co-cure agent or mixture or co-cure agents. In certain embodiment, the elastomeric compositions including between about 1 phr and about 30 phr of a metal-containing organic co-cure agent or mixture or co-cure agents. In certain embodiment, the elastomeric compositions including between about 1 phr and about 20 phr of a metal-containing organic co-cure agent or mixture or co-cure agents. In certain embodiment, the elastomeric compositions including between about 3 phr and about 20 phr of a metal-containing organic co-cure agent or mixture or co-cure agents. In other embodiments, the elastomeric compositions including between about 3 phr and about 10 phr of a metal-containing organic co-cure agent or mixture or co-cure agents increase water swell capability, doubling it compared to swellable elastomer without metal-containing organic co-cure co-agent. The present composition may thus be formulated to reduce and even minimize the loading amount of SAPs in the swellable compositions of this invention. As stated above, SAPs have negative impact on mechanical/physical properties of the rubber or elastomeric composition. Moreover, compositions including metal-containing organic co-cure agents allow for an increase in covalent crosslink density, which results in enhanced physical and mechanical properties of the final composition. By using the co-curing agents of this invention, the inventors do not have to offset physical and mechanical properties of swellable elastomeric compositions to enhance water swell capability.

Compositional Ranges Using in this Invention

Embodiments of the compositions of this invention comprises:
100 phr of one elastomer or a mixture of elastomers,
about 1 phr to about 30 phr of a conventional cure system,
about 1 phr to about 50 phr of a co-cure system,
about 0 phr to about 150 phr of one SAP or a mixture of SAPs, and
about 0 phr to about 100 phr of fillers or other materials.

Embodiments of the compositions of this invention comprises:
100 phr of one elastomer or a mixture of elastomers,
about 1 phr to about 20 phr of a conventional cure system,
about 1 phr to about 40 phr of a co-cure system,
about 0 phr to about 150 phr of one SAP or a mixture of SAPs, and
about 0 phr to about 100 phr of fillers or other materials.

Embodiments of the compositions of this invention comprises:
100 phr of one elastomer or a mixture of elastomers,
about 1 phr to about 15 phr of a conventional cure system,
about 1 phr to about 30 phr of a co-cure system,
about 0 phr to about 100 phr of one SAP or a mixture of SAPs, and
about 0 phr to about 100 phr of fillers or other materials.

Embodiments of the compositions of this invention comprises:
100 phr of one elastomer or a mixture of elastomers,
about 1 phr to about 15 phr of a conventional cure system,
about 1 phr to about 20 phr of a co-cure system,
about 0 phr to about 100 phr of one SAP or a mixture of SAPs, and
about 0 phr to about 100 phr of fillers or other materials.

Suitable Reagents for Use in the Invention

Suitable water swellable elastomers for use in the present invention, include without limitation, water/aqueous swellable elastomers and water/oil hybrid swellable elastomers and mixtures and/or combination thereof—mixtures mean that the network is composed of a mixture of the elastomers, while combination mean that the net work is composed of domains of one elastomer or domains including a mixture of elastomers.

Suitable metal-containing compound include, without limitation, metal acrylates, metal methacrylates, metal acetates, metal carboxylates, metal sulfonates, metal sulfates, metal phosphites, metal phosphates, metal silicon analogs, metal germanium analogs, metal boron nitride analogs, similar organic or pseudo organic compounds, and mixture and/or combinations thereof, where the metals are selected from the group consisting of alkali metals, alkaline earth metals, transition metals, lanthanide metals, actinide metals, metalloids and mixtures and/or combinations thereof. The metal-containing compounds may be mono-functional, di-functional, tri-functional, tetra-functional, penta-functional, or higher-functional depending on the valence state of the metal.

Exemplary non-limiting examples of mono-functional organic compounds include:

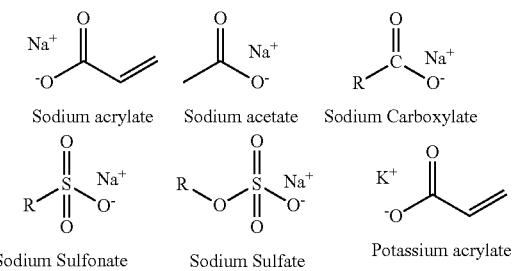

Exemplary non-limiting examples of di-functional organic compounds include:

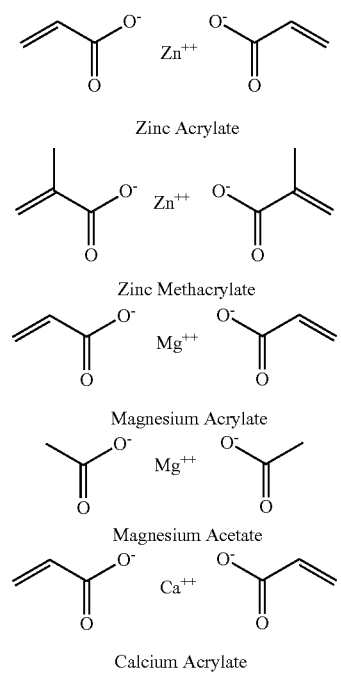

Exemplary non-limiting examples of tri-functional organic compounds include:

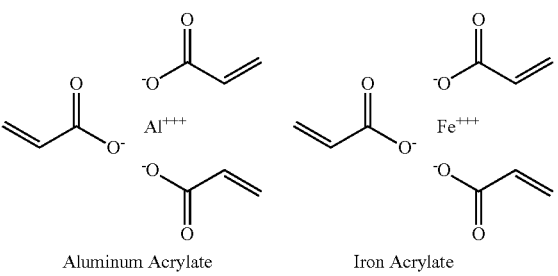

The elastomeric compositions of this invention may comprise any number of additives, fillers, and the like, depending on the end use of the oilfield element. One such additive is an inorganic swelling agent, which functions to enhance the water-swellability of the elastomeric compositions useful in the invention. Inorganic swelling agents useful for this purpose include alkali- and alkaline earth carbonates, such as, but not limited to, carbonates of sodium (sodium carbonate; soda ash). Sodium carbonate may also act as a foaming agent and enhance the permeation and rate of swelling.

Apparatus in accordance with the invention include those wherein the elastomeric composition is vulcanized by an organic vulcanizing agent. Examples of organic vulcanization elements useful in the invention may be selected from organic peroxides, such as, but not limited to, dicumyl peroxide.

The base elastomer may include a zwitterionic polymer blended into the base elastomer, or a copolymer of zwitterionic monomers and unsaturated monomers like butadiene and isoprene, allowing production of a crosslinkable elastomer that swells in high salinity brines as well as in hydrocarbon oil-based fluids. A diene monomer may be included for crosslinking cites. Representative zwitterionic polymers useful in the invention include, but are not limited to, copolymers of 2-methacryloyloxyethyl-2'-trimethylammonium ethyl phosphate inner salt (MPC) with comonomers, including a variety of hydrophobic monomers, for instance $C_{4-18}$-alkyl methacrylate, and fluoroalkyl methacrylates.

The elastomer composition may be selected from any elastomer listed in ASTM D1418, and may comprise one or more non-elastomeric polymers selected from natural and synthetic polymers, including those listed in ASTM D1600-92, "Standard Terminology for Abbreviated Terms Relating to Plastics". The elastomer and non-elastomer may be layered, wherein individual layers may be the same or different in composition and thickness, interpenetrating networks, and the like. The elastomer composition may include fillers, plasticizers, accelerants, fibers, nanoflakes and/or nanoplatelets. Non-elastomeric polymers may include, but are not limited to, thermoplastic polymers, such as polyolefins, polyamides, polyesters, thermoplastic polyurethanes and polyurea urethanes, copolymers, and blends thereof, and the like; one or more thermoset polymers, such as phenolic resins, epoxy resins, and the like.

Apparatus within the invention include those wherein the oilfield element may be any element exposed to water, brine, low and high pH fluids, and/or hydrocarbon fluids, such as, but not limited to packer elements (the elastomeric components), submersible pump motor protector bags, sensor protectors, blow out preventer elements, O-rings, T-rings, gaskets, pump shaft seals, tube seals, valve seals, seals and insulators used in electrical components, such as wire and cable semiconducting shielding and/or jacketing, power cable coverings, seals and bulkheads such as those used in fiber optic connections and other tools, and pressure sealing elements for fluids (gas, liquid, or combinations thereof). Other applications are disclosed in United States Patent Application Publication Nos. 20090260801, 20090211770, 20090211767, 20090277652, 20090272525, and 20090272541, which are incorporated by reference by and due to the operation of the Closing Paragraph.

Another aspect of the invention are oilfield assemblies for exploring for, testing for, or producing hydrocarbons, one oilfield assembly comprising:
(a) one or more oilfield elements; and
(b) one or more of the oilfield elements comprising an apparatus comprising an elastomeric composition as described in one of the first, second and third aspects of the invention.

Yet another aspect of the invention are methods of exploring for, drilling for, or producing hydrocarbons, one method comprising:
(a) selecting one or more oilfield elements having a component comprising an elastomeric composition as described in one of the first, second and third aspects of the invention; and
(b) using the oilfield element in an oilfield operation, thus exposing the oilfield element to an oilfield environment.

Methods of the invention may include, but are not limited to, running one or more oilfield elements into a wellbore using one or more surface oilfield elements, and/or retrieving the oilfield element from the wellbore. The oilfield environment during running and retrieving may be the same or different from the oilfield environment during use in the wellbore or at the surface.

The various aspects of the invention will become more apparent upon review of the brief description of the drawings, the detailed description of the invention, and the claims that follow.

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes apparatus comprising an elastomeric material useful in oilfield applications, including hydrocarbon exploration, drilling, testing, completion, and production activities. As used herein the term "oilfield" includes land based (surface and sub-surface) and sub-seabed applications, and in certain instances seawater applications, such as when hydrocarbon exploration, drilling, testing or production equipment is deployed through seawater. The term "oilfield" as used herein includes hydrocarbon oil and gas reservoirs, and formations or portions of formations where hydrocarbon oil and gas are expected but may ultimately only contain water, brine, or some other composition. A typical use of the apparatus comprising an elastomeric component will be in downhole applications, such as zonal isolation of wellbores, although the invention is not so limited. A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

Recently there has been a growing interest in swellable elastomers for use in oilfield applications. In order to make elastomers swell in water, previous publications have disclosed elastomer formulations that contain super absorbent polymers like hydrogels (Report #RUS 1-1464-ST-04, Institute of Rubber coatings and products, L. Akopyan, Moscow Research center and references therein). The main drawback of using hydrogels is that hydrogel containing swellable polymers do not possess long term physical integrity. This is because the hydrogel particles embedded in the elastomer tends to migrate to the surface of the elastomer part and into the water phase. As a result, elastomer/hydrogel blends show a nonuniform swelling and develop blisters on the surface when exposed to water. After a few days of exposure to water these blisters burst open and hydrogel particles are ejected out of the blend leaving behind cracks in the elastomer.

Suitable curable elastomers include, without limitation, nitrile-butadiene rubber (NBR), hydrogenated NBR, hydrogenated nitrile rubber (HNBR), chemically functionalized NBR (Carboxylated NBR), ethylene-propylene-diene-copolymer (EPDM), ethylene-propylene ruber (EPR), fluorinated elastomers (FKM, FFKM, FEPM), styrene-butadiane rubber (SBR), hydrogenated styrene-butadiene rubber (hSBR), isoprene-butadiene rubber (IBR), hydrogenated isoprene-butadiene rubber (hIBR), styrene-isoprene rubber (SIR), hydrogenated styrene-isoprene rubber (hSIR), styrene-butadiene-isoprene (SIBR), hydrogenated styrene-butadiene-isoprene rubber (hSIBR), block, triblock and multi-block polymers of styrene-isoprene, styrene-butadiene, styrene-butadiene-isoprene thermoplastic elastomers, hydrogenated block, triblock and multi-block polymers of styrene-isoprene, styrene-butadiene, styrene-butadiene-isoprene thermoplastic elastomers, silicone rubbers, chlorosulfonated polyethylene (CSM), or mixtures and combinations thereof.

Elastomeric compositions and methods of making same described herein provide a concept of making low-cost commercial elastomers containing some double bonds swellable in water. "Elastomer" as used herein is a generic term for substances emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multi-polymers. Examples include ethylene-propylene-diene polymer (EPDM), various nitrile rubbers which are copolymers of butadiene and acrylonitrile such as Buna-N (also known as standard nitrile and NBR). By varying the acrylonitrile content, elastomers with improved oil/fuel swell or with improved low-temperature performance can be achieved. Specialty versions of carboxylated high-acrylonitrile butadiene copolymers (XNBR) provide improved abrasion resistance, and hydrogenated versions of these copolymers (HNBR) provide improve chemical and ozone resistance elastomers. Carboxylated HNBR is also known. As used herein the phrases "swellable in water", "water-swellable", "water swellability" and the like are used interchangeably and mean that the elastomeric composition swells in contact with aqueous system including pure water, brines, and other aqueous solutions. The compositions of this invention will generally swell at least up to 25 percent in an aqueous system. In certain embodiments, the compositions may swell at least 1000 percent. The amount of swellability of a compositions depends at least on sample thickness, the elastomers used to form the composition, the ratio of covalent crosslinks to ionic crosslinks, the amount of the optional ionic additive system, and crosslink density. In other embodiments, the compositions may swell at least 200 percent of their original volume after soaking in tap water at 100° C. for 24 hours. Similarly, the phrases "swellable in oil", "oil-swellable", "oil swellability" and the like are used interchangeably and mean that the elastomeric composition swells in organic systems or non-aqueous systems such as in organic solvents. In general, the compositions of this invention will swell at least 25 percent in an organic system. In other embodiments, the compositions may swell at least 100 percent in an organic system. In other embodiments, the compositions may swell at least 300 percent of their original volume after soaking in kerosene at 100° C. for 24 hours.

Elastomeric compositions useful in the invention include those that are: 1) low-cost and water-swellable; 2) low-cost and water- and oil-swellable; 3) swellable in high-salinity brines like completion fluids; 4) high-temperature stable; and 5) low-cost and swellable in very low pH solutions. Elastomeric compositions disclosed herein may be used for sealing applications in oilfield industry especially for applications such as swellable packers, flow control, sand control, and coil tubing slack management. These materials may also be used as self-healing seals for downhole applications. One major advantage of elastomeric compositions disclosed herein is that all the elastomers and additives mentioned in this disclosure except the high-salinity swellable elastomers and the high-temperature swellable elastomers are, at least presently, relatively low cost, commercially available materials. The elastomeric compositions useful in oilfield elements of the invention may be readily made in small or large quantities by using standard elastomer manufacturing techniques such as Banbury and two roll mill compounding.

Polymers Having Residual Ethylenic Unsaturation

The linear or branched polymer having residual ethylenic unsaturation functions as the main structural component of the elastomer, and, depending on its length, solubility parameter, and other factors, largely determines the oil-swellability of the composition and therefore the oil-swellability of the oilfield element. Examples of linear or branched chain polymers having residual ethylenic unsaturation include polymers of ethylene-propylene-diene monomer (EPDM), Other examples of linear or branched chain polymers having residual ethylenic unsaturation include natural rubber, polybutadiene, polyisoprene, ethylene-octene-based rubber and the like. Both cis and trans versions, as well as derivatized versions (side chains) of any of these may be used, as long as they do not affect the basic swellability properties sought in the final product elastomeric composition.

Ethylene-propylene-diene monomer polymers may comprise an ethylene copolymer or terpolymer of a ($C_3$-$C_{10}$) diene-olefin and anon-conjugated diene or triene, and may have an average molecular weight ranging from about 1000 to 40,000, or from 6,000 to 10,000, on which, at some stage of one of the processes, has been grafted or added physically 0.1 to 10 percent by weight, or 1.0 to 3.0 percent by weight of an ethylenically unsaturated carboxylic function.

More complex polymer substrates, often designated as interpolymers, may be prepared using a third component. The third component, if used, may be a polyene monomer selected from non-conjugated dienes and trienes. The non-conjugated diene component may have from 5 to 14 carbon atoms in the chain. Preferably, the diene monomer is characterized by the presence of a vinyl group in its structure and can include cyclic and bi-cyclo compounds. A mixture of more than one diene, more than one triene, or mixture of dienes and trienes may be used.

Representative dienes include, but are not limited to, non-conjugated dienes such as dicyclopentadiene, 5-ethylidene-2-norbornene, 5-methylene-2-norbornene 1,4-hexadiene, 1,4-cyclohexadiene, 1,5-heptadiene, and 1,6-octadiene.

The triene component, if used, will have at least two non-conjugated double bonds, and may have up to about 30 carbon atoms in the chain. Typical trienes useful in preparing elastomers useful in the invention include, but are not limited to, 1-isopropylidene-3a,4,7,7a-tetrahydroindene, 1-isopropylidenedicyclopentadiene, dehydro-isodicyclopenta-diene, and 2-(2-methylene-4-methyl-3-pentenyl)-2.2.1-bicyclo-5-heptene.

Inorganic Swelling Agent

The elastomeric composition may comprise any number of additives, fillers, and the like, depending on the end use of the oilfield element. It is believed that these materials may be added to alter or modify certain properties, when added in amounts up to about 5 parts per hundred weight of composition.

Vulcanizing (Curing) Agent

Suitable cure systems include, without limitation, sulfur based cure systems, peroxide based cure systems, radiation based cure systems, or mixtures and combinations thereof. Exemplary crosslinking system include, without limitation, peroxides, sulfur, sulfur-donors, amines, phenolic resins, metal oxides, irradiation sources, bisphenol, any other crosslinking system that can generate free radicals, ions, or any other reactive sites on the molecular chain of elastomers, or mixtures and combinations thereof.

Apparatus in accordance with the invention include those wherein the elastomeric composition is vulcanized by an organic vulcanizing agent. An inorganic vulcanization agent may be included, such as one or more inorganic metallic oxides, and certain metals such as selenium. Heat, high energy radiation, chemical accelerators and other means may be used in conjunction with the organic vulcanization agent.

Examples of organic vulcanization elements useful in the invention may be selected from organic peroxides, such as dicumyl peroxide, tert-butyl cumyl peroxide, di-tert-butyl-peroxide, di(tert-butylperoxyisopropyl)benzene, dibenzoyl peroxide, di(2,4-dichlorobenzoyl)peroxide, di(4-methylbenzoyl)peroxide, 2,5-Dimethyl-2,5-di(tert-butylperoxy) hexane, 2,5-dimethyl-2,5-di(tert-butylperoxy)hexyne, butyl 4,4-di(tert-butylperoxy)valerate, 1,1-di(tert-butylperoxy)-3,3,5-trimethylcyclohexane, tert-butyl peroxy-3,5,5-trimethylhexanoate, tert-butyl peroxybenzoate, and the like, and mixtures thereof. Various grades of these organic peroxides are available from AKZO NOBEL NV under the trade designations PERKADOX and TRIGONOX.

Halogenated quinones may be used as organic vulcanization elements, including those such as chlorinated quinones such as chloranil and 2,3-dichloro-5,6-dicyanoquinone, and the like, and mixtures thereof.

Nitrobenzenes, nitrotoluenes, nitroxylenes, and ortho-, meta-, and para-derivatives thereof may be used as organic vulcanization elements. Useful p-nitrobenzene derivatives include, but are not limited to, for example, p-nitrofluorobenzene, p-nitrochlorobenzene, p-nitrobromobenzene, p-nitroiodobenzene, p-nitrophenol, p-nitrobenzoic acid, and p-nitrobenzoic acid chloride. Other useful nitrobenzene derivatives include 2-methyl-4-nitrophenol, 2-trifluoromethyl-4-nitrophenol, 2-methyl-4-nitrobenzoic acid, 2-methyl-4-nitrobenzoic acid chloride, 2-trifluoromethyl-4-nitrobenzoic acid, 2-trifluoromethyl-4-nitrobenzoic acid chloride or acetanilide. A combination thereof may be suitably selected depending upon the particular purpose taking into consideration the reactivity and the availability of the materials. It should be mentioned that those exemplified here are only examples.

Fillers and Optional Ingredients

It is well known in rubber industry that the use of fillers may reduce the swelling and permeability of polymeric materials. In general, the reduction in swelling and permeability increases as the filler concentration is increased. The permeability of polymeric materials may also depend on the shape and aspect ratio of the filler particles. Platelet like fillers such as nanoclays, preferably with small thickness (<0.1 micrometer) and length less than 200 micrometers, when aligned, may create a torturous path for diffusing fluid molecules and therefore may enhance the barrier properties of the resultant materials compared with barrier properties of raw polymer of the same composition and morphology. Suitable additives for use in the compositions of this invention include fillers and reinforcing fillers such as carbon black, silica, clay, etc., process aids, antioxidants, antiozonants, flame retardants, etc. or mixtures or combinations thereof.

Thermoplastic and Thermoset Polymeric Materials

Relatively non-elastic polymeric materials (relative to elastomers), such as thermoplastic and thermoset polymeric materials, may be combined or mixed with the elastomers, at a weight of from about 1 to 40 phr of the elastomer composition. Relatively non-elastic polymeric materials useful in the invention may be selected from natural and synthetic polymers, blends of natural and synthetic polymers, and layered versions of polymers, wherein individual layers may be the same or different in composition and thickness. The non-elastic polymer may comprise one or more thermoplastic polymers and/or one or more thermoset and/or thermally cured polymers, and combinations thereof.

A thermoplastic material is defined as a polymeric material (preferably, an organic polymeric material) that softens and melts when exposed to elevated temperatures and generally returns to its original condition, i.e., its original physical state, when cooled to ambient temperatures. During the manufacturing process of an oilfield element, the thermoplastic material may be heated above its softening temperature, and preferably above its melting temperature, to cause it to flow and form the desired shape of the oilfield element in conjunction with the elastomer. After the desired shape is formed, the thermoplastic substrate is cooled and solidified. In this way, thermoplastic materials (including thermoplastic elastomers) can be molded into various shapes and sizes.

Moldable thermoplastic materials that may be used are those having a high melting temperature, good heat resistant properties, and good toughness properties such that the oilfield element or assemblies containing these materials operably withstand oilfield conditions without substantially deforming or disintegrating.

Thermoplastic polymers useful as polymeric matrix materials are those able to withstand expected temperatures, temperature changes, and temperature differentials (for example a temperature differential from one surface of a gasket to the other surface material to the other surface) during use, as well as expected pressures, pressure changes, and pressure differentials during use, with a safety margin on temperature and pressure appropriate for each application.

Examples of thermoplastic materials suitable for use in the invention in oilfield elements according to the present invention include polyolefins, polyamides, polyesters, thermoplastic polyurethanes and polyurea urethanes, PP, PE, PP-PE copolymer, PVC and other polyolefins, polyamides, polyetheretherketones (PEEK), polyaryletherketones (PAEK), polyetherimides (PEL), copolymers of tetrafluoroethylene and perfluorovinylether (PFA), perfluoroalkoxy copolymers (MFA), polycarbonates, polyetherimides, polyesters, polysulfones, polystyrenes, acrylonitrile-butadiene-styrene block copolymers, acetal polymers, polyaxnides, copolymers, blends, and other combinations thereof, and the like. Of this list, polyamides and polyesters may provide better performance. Polyamide materials are useful at least because they are inherently tough and heat resistant, and are relatively inexpensive. Polyamide resin materials may be characterized by having an amide group, i.e., —C(O)NH—. Various types of polyamide resin materials, i.e., nylons, can be used, such as nylon 6/6 or nylon 6. Of these, nylon 6 may be used if a phenolic-based coating is used because of the excellent adhesion between nylon 6 and phenolic-based coatings. Nylon 6/6 is a condensation product of adipic acid and hexamethylenediamine. Nylon 6/6 has a melting point of about 264° C. and a tensile strength of about 770 kg/cm$^2$. Nylon 6 is a polymer of ϵ-caprolactam. Nylon 6 has a melting point of about 223° C. and a tensile strength of about 700 kg/cm$^2$. Examples of commercially available nylon resins useable in oilfield elements according to the present invention include those known under the trade designations VYDYNE from Solutia, St. Louis, Mo.; ZYTEL and MINLON both from DuPont, Wilmington, Del.; TROGAMID T from Degussa Corporation, Parsippany, N.J.; CAPRON from BASF, Florham Park, N.J.; NYDUR from Mobay, Inc., Pittsburgh, Pa.; and ULTRAMID from BASF Corp., Parsippany, N.J. Mineral-filled thermoplastic materials can be used, such as the mineral-filled nylon 6 resin MINLON, from DuPont.

Suitable thermoset (thermally cured) polymers for use in elastomeric compositions of the invention include phenolic resins, epoxy resins, phenoxy, phenolic, ester, polyurethane, polyurea, and the like. Thermoset molding compositions known in the art are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness.

Adhesion Promoters, Coupling Agents and Other Optional Ingredients

The elastomeric composition may comprise other ingredients in addition to the monomers, polymers, and other ingredients already mentioned, such as fillers, coupling agents, suspension agents, pigments, and the like.

Besides the polymeric material, the elastomer composition may include an effective amount of a fibrous reinforcing material. Herein, an "effective amount" of a fibrous reinforcing material is a sufficient amount to impart at least improvement in the physical characteristics of the oilfield element, i.e., heat resistance, toughness, flexibility, stiffness, shape control, adhesion, etc., but not so much fibrous reinforcing material as to give rise to any significant number of voids and detrimentally affect the structural integrity of the oilfield element. The amount of the fibrous reinforcing material in the elastomeric composition may be any amount that does not substantially detrimentally affect the desired swellability properties achieved by the elastomeric composition, and may be within a range of about 1-40 parts, or within a range of about 5-35 parts, or within a range of about 15-30 parts by weight, for every 100 parts by weight of polymer.

The fibrous reinforcing material may be in the form of individual fibers or fibrous strands, or in the form of a fiber mat or web. The mat or web can be either in a woven or nonwoven matrix form. Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic materials, or fibers made from ceramic materials.

By "heat resistant" organic fibers, it is meant that useable organic fibers must be resistant to melting, or otherwise breaking down, under the conditions of manufacture and use of the oilfield elements of the present invention. Examples of useful natural organic fibers include wool, silk, cotton, or cellulose. Examples of useful synthetic organic fibers include polyvinyl alcohol fibers, polyester fibers, rayon fibers, polyamide fibers, acrylic fibers, aramid fibers, or phenolic fibers. Generally, any ceramic fiber is useful in applications of the present invention. An example of a ceramic fiber suitable for the present invention is NEXTEL which is commercially available from 3M Co., St. Paul, Minn. Glass fibers may be used, at least because they impart desirable characteristics to the oilfield elements and are relatively inexpensive. Furthermore, suitable interfacial binding agents exist to enhance adhesion of glass fibers to thermoplastic materials. Glass fibers are typically classified using a letter grade. For example, E glass (for electrical) and S glass (for strength). Letter codes also designate diameter ranges, for example, size "D" represents a filament of diameter of about 6 micrometers and size "G" represents a filament of diameter of about 10 micrometers. Useful grades of glass fibers include both E glass and S glass of filament designations D through U. Preferred grades of glass fibers include E glass of filament designation "G" and S glass of filament designation "G." Commercially available glass fibers are available from Specialty Glass Inc., Oldsmar, Fla.; Johns Manville, Littleton, Colo.; and Mo-Sci Corporation, Rolla, Mo. If glass fibers are used, the glass fibers may be accompanied by an interfacial binding agent, i.e., a coupling agent, such as a silane coupling agent, to improve the adhesion to the thermoplastic material. Examples of silane coupling agents include "Z-6020" and "-6040," available from Dow Corning Corp., Midland, Mich.

The elastomer compositions of the present invention may further include an effective amount of a toughening agent. This will be preferred for certain applications. A primary purpose of the toughening agent is to increase the impact strength of the oilfield elements. By "an effective amount of a toughening agent" it is meant that the toughening agent is present in an amount to impart at least improvement in toughness without the component becoming too flexible. Elastomeric portions of oilfield elements of the present invention may contain between about 1 and 30 phr of a toughening agent. For example, the less elastomeric characteristics a toughening agent possesses, the larger quantity of the toughening agent may be required to impart desirable properties to the oilfield elements of the present invention. Toughening agents that impart desirable stiffness characteristics to the oilfield elements of the present invention include rubber-type polymers and plasticizers. Of these, the rubber toughening agents may be mentioned, and synthetic elastomers. Examples of preferred toughening agents, i.e., rubber tougheners and plasticizers, include: toluenesulfonamide derivatives (such as a mixture of N-butyl- and N-ethyl-p-toluenesulfonamide, commercially available from Akzo Chemicals, Chicago, Ill., under the trade designation KETJENFLEX 8; styrene butadiene copolymers; polyether backbone polyamides (commercially available from Atochem, Glen Rock, N.J., under the trade designation PEBAX); rubber-polyamide copolymers (commercially available from DuPont, Wilmington, Del., under the trade designation ZYTEL FN); and functionalized triblock polymers of styrene-(ethylene butylene)-styrene (commercially available from Shell Chemical Co., Houston, Tex., under the trade designation KRATON FG1901); and mixtures of these materials. Of this group, rubber-polyamide copolymers and styrene-(ethylene butylene)-styrene triblock polymers may be used, at least because of the beneficial characteristics they may impart. Commercial compositions of toughener and thermoplastic material are available, for example, under the designation ULTRAM1D from BASF Corp., Parsippany, N.J. Specifically, ULTRAMID B3ZG6 is a nylon resin containing a toughening agent and glass fibers that is useful in the present invention.

Other materials that may be added to the elastomeric composition for certain applications of the present invention include inorganic or organic fillers. Inorganic fillers are also known as mineral fillers. A filler is defined as a particulate material, typically having a particle size less than about 100 micrometers, preferably less than about 50 micrometers, but larger than about 1 micrometer. Examples of useful fillers for applications of the present invention include carbon black, calcium carbonate, silica, calcium metasilicate, cryolite, phenolic fillers, or polyvinyl alcohol fillers. If a filler is used, it is theorized that the filler may fill in between reinforcing fibers if used, and may prevent crack propagation through the elastomer. Typically, a filler would not be used in an amount greater than about 20 percent based on the weight of the elastomeric composition.

Other useful materials or components that may be added to the elastomeric compositions for certain applications of the present invention include, but are not limited to, oils, antistatic agents, flame retardants, heat stabilizers, ultraviolet stabilizers, internal lubricants, antioxidants, and processing aids. One would not typically use more of these components than needed for desired results.

The apparatus of the invention, in particular the elastomeric elements, if filled with fillers, may also contain coupling agents. When an organic polymeric matrix has an inorganic filler, a coupling agent may be desired. Coupling agents may operate through two different reactive functionalities: an organofunctional moiety and an inorganic functional moiety. When a resin/filler mixture is modified with a coupling agent, the organofunctional group of the coupling agent becomes bonded to or otherwise attracted to or associated with the uncured resin. The inorganic functional moiety appears to generate a similar association with the dispersed inorganic filler. Thus, the coupling agent acts as a bridge between the organic resin and the inorganic filler at the resin/filler interface. In various systems this results in:
1. Reduced viscosity of the resin/filler dispersion, generally facilitating application.
2. Enhanced suspendability of the filler in the resin, i.e., decreasing the likelihood that suspended or dispersed filler will settle out from the resin/filler suspension during storing or processing to manufacture oilfield elements.
3. Improved product performance due to enhanced operation lifetime, for example through increased water resistance or general overall observed increase in strength and integrity of the bonding system.

Herein, the term "coupling agent" includes mixtures of coupling agents. An example of a coupling agent that may be found suitable for this invention is gamma-methacryloxypropyltrimethoxy silane known under the trade designation SILQUEST A 174 from GE Silicones, Wilton, Conn. Other suitable coupling agents are zircoaluminates, and titanates.

The elastomeric composition may include a shape stabilizer, i.e., a thermoplastic polymer with a melting point higher than that described above for the thermoplastic material. Suitable shape stabilizers include, but are not limited to, poly(phenylene sulfide), polyimides, and polyaramids. An example of a preferred shape stabilizer is polyphenylene oxide nylon blend commercially available from GE Plastics, Pittsfield, Mass., under the trade designation GTX 910.

Oilfield Elements and Assemblies

An "oilfield assembly", as used herein, is the complete set or suite of oilfield elements that may be used in a particular job. All oilfield elements in an oilfield assembly may or may not be interconnected, and some may be interchangeable.

An "oilfield element" includes, but is not limited to one or more items or assemblies selected from zonal isolation tool elastomeric elements, packer elements, blow out preventer elements, self-healing cements, proppants, O-rings, T-rings, electric submersible pump protectors, centralizers, hangers, plugs, plug catchers, check valves, universal valves, spotting valves, differential valves, circulation valves, equalizing valves, safety valves, fluid flow control valves, connectors, disconnect tools, downhole filters, motor heads, retrieval and fishing tools, bottom hole assemblies, seal assemblies, snap latch assemblies, anchor latch assemblies, shear-type anchor latch assemblies, no-go locators, and the like.

A "packer" is a device that can be run into a wellbore with a smaller initial outside diameter that then expands externally to seal the wellbore. Packers employ flexible, elastomeric seal elements that expand. The two most common forms are the production or test packer and the inflatable packer. The expansion of the former may be accomplished by squeezing the elastomeric elements (somewhat doughnut shaped) between two plates or between two conical frusta pointed inward, forcing the elastomeric elements' sides to bulge outward. The expansion of the latter may be accomplished by pumping a fluid into a bladder, in much the same fashion as a balloon, but having more robust construction. Production or test packers may be set in cased holes and inflatable packers may be used in open or cased holes. They may be run down into the well on wireline, pipe or coiled tubing. Some packers are designed to be removable, while others are permanent. Permanent packers are constructed of materials that are easy to drill or mill out. A packer may be used during completion to isolate the annulus from the production conduit, enabling controlled production, injection or treatment. A typical packer assembly incorporates a means of securing the packer against the casing or liner wall, such as a slip arrangement, and a means of creating a reliable hydraulic seal to isolate the annulus, typically by means of an expandable elastomeric element. Packers are classified by application, setting method and possible retrievability. Inflatable packers are capable of relatively large expansion ratios, an important factor in through-tubing work where the tubing size or completion components can impose a significant size restriction on devices designed to set in the casing or liner below the tubing. Seal elements may either be bonded-type or chevron-type, and may employ seal elements comprising one or more elastomeric compositions described herein, and these elastomeric compositions may comprise one or more thermoplastic polymers, such as the polytetrafluoroethylene known under the trade designation TEFLON, available from E.I. DuPont de Nemours & Company; the polyphenylene sulfide thermoplastics known under the trade designation RYTON and polyphenylene sulfide-based alloys known under the trade designation XTEL both available from Chevron Phillips Chemical Company LP. Both bond-type and chevron-type seal elements are available from Schlumberger.

EXPERIMENTS OF THE INVENTION

Example 1

This example illustrates preparations of EPDM compositions Formula A-C. Formula A is a comparative example including no ionic bonding system of this invention. Formulas B-C are compositions of this invention including 1.5 phr and 3.0 phr of an ionic bonding system of this invention. The compositions are set forth in Table I based on 100 parts per hundred (phr) EPDM Rubber with equivalent general ingredients for compounds of rubber and Super Absorbent Polymer for aqueous swell. Test results for Formulas A-C are tabulated in Table II.

TABLE I

Ingredient List, Amounts and Properties

| COMPOUND NAME | A* | B | C |
|---|---|---|---|
| MATERIAL | phr | phr | phr |
| Zinc Diacrylate | 0.00 | 1.50 | 3.00 |
| Dicumyl Peroxide 40% effective | 5.00 | 5.00 | 5.00 |

TABLE II

Result of mass % increase: ASTM D471 Fluid Ageing Test Specimens: rectangular solid having dimensions of 1" × 2" × 0.08"

| Cured for 90 minutes at 300° F. | A | B | C |
|---|---|---|---|
| Mass % gain in distilled water at 212° F., 65 hrs | 758% | 1042% | 1371% |
| Mass % gain in 3 wt. % NaCl aqueous solution at 212° F., 65 hrs | 146 wt % | 152 wt % | 178 wt % |

Example 2

This example illustrates another preparation of EPDM compositions Formulas D-F of this invention. The compositions are set forth in Table III based on 100 parts per hundred (phr) EPDM Rubber with equivalent general ingredients for compounds of rubber and Super Absorbent Polymer for aqueous swell. Test results for Formulas A and D-F are tabulated in Table IV.

TABLE III

Ingredient List, Amounts and Properties

| COMPOUND NAME | A | D | E | F |
|---|---|---|---|---|
| MATERIAL | phr | phr | phr | phr |
| Zinc Diacrylate | 0.00 | 8.00 | 8.00 | 8.00 |
| Dicumyl Peroxide 40% effective | 5.00 | 6.00 | 7.00 | 10.00 |

TABLE IV

Result of mass % increase: ASTM D471 Fluid Ageing Test Specimens: rectangular solid having dimensions of 1" × 2" × 0.08"

| Cured for 90 min. @ 300° F. | A | D | E | F |
|---|---|---|---|---|
| Mass % gain in 3 wt. % NaCl aqueous solution at 212° F., 65 hrs | 146 wt % | 193 wt % | 159 wt % | 130 wt % |

Example 3

This example illustrates another preparation of EPDM compositions Formulas C, G and E of this invention. The compositions are set forth in Table V based on 100 parts per hundred (phr) EPDM Rubber with equivalent amount of general ingredients for compounds of rubber and Super Absorbent Polymer for aqueous swell. Test results for Formulas A, C, G, and E are tabulated in Table VI.

TABLE V

Ingredient List, Amounts and Properties

| Reagent | A | C | G | E |
|---|---|---|---|---|
| EPDM | 100 | 100 | 100 | 100 |
| Zinc Diacrylate | 0 | 3 | 5 | 8 |
| Dicumyl Peroxide 40% effective* | 5 | 5 | 5 | 7 |

*Formulas cured for 90 minutes at 300° F.

TABLE VI

Mass % Gain of a Compression Set Button and Mechanical Properties Specimens: Compression Set button having 0.49" thickness and 1.14" diameter

| | | | Formula | | | |
|---|---|---|---|---|---|---|
| | | | A | C | G | E |
| Mass % gain of compression set button | 90 hrs ageing in fluid | water | 155% | 190% | 295% | 168% |
| | | 3 wt. % NaCl aqueous solution | 41% | 46% | 55% | 52% |
| Initial Mechanical properties | Initial | Compression Set (ASTMD395-B) | 64 | 53 | 54 | 47 |
| | | Tear Strength (lb/in) ASTMD624-C | 98 | 133 | 142 | 155 |
| | | Tensile Stress (psi) ASTMD412-C | 513 | 606 | 493 | 900 |
| | | Elongation (%) | 574 | 498 | 514 | 420 |
| | | 50% Modulus (%) | 175 | 250 | 238 | 280 |
| Tensile after aging (212° F., 70 hours) | 3 wt. % NaCl aqueous solution | Tensile Stress (psi) | 456 | 473 | 474 | 700 |
| | | 50% Modulus (%) | 73 | 75 | 80 | 95 |

Example 4

Combination of Various Metal Organic Compounds

This example illustrates another preparation of an EPDM composition of this invention. The composition is set forth in Table below based on 100 parts per hundred (phr) EPDM Rubber with equivalent amount of general ingredients for compounds of rubber and Super Absorbent Polymer for aqueous swell.

TABLE V

Ingredient List, Amounts and Properties

| | FORMULA | | |
|---|---|---|---|
| | A | H | I |
| MATERIAL | phr | phr | phr |
| Zinc Diacrylate | 0 | 3 | 3 |
| Aluminum Triacrylate | 0 | 5 | 0 |
| Calcium Diacrylate | 0 | 0 | 5 |
| Dicumyl Peroxide 40% effective | 5 | 5 | 5 |

TABLE VI

Mass % Gain of a Compression Set Button: Fluid Ageing Specimens: Compression Set button having 0.49" thickness and 1.14" diameter

| Cured for 90 min. @ 300° F. | A | H | I |
|---|---|---|---|
| Mass % gain in 3% NaCl brine solution at 212° F., in 30 days | 60 | 109 | 116 |
| Mass % gain in 3% CaCl$_2$ brine solution at 212° F., in 40 days | 68 | 87 | 98 |

Figure 4:
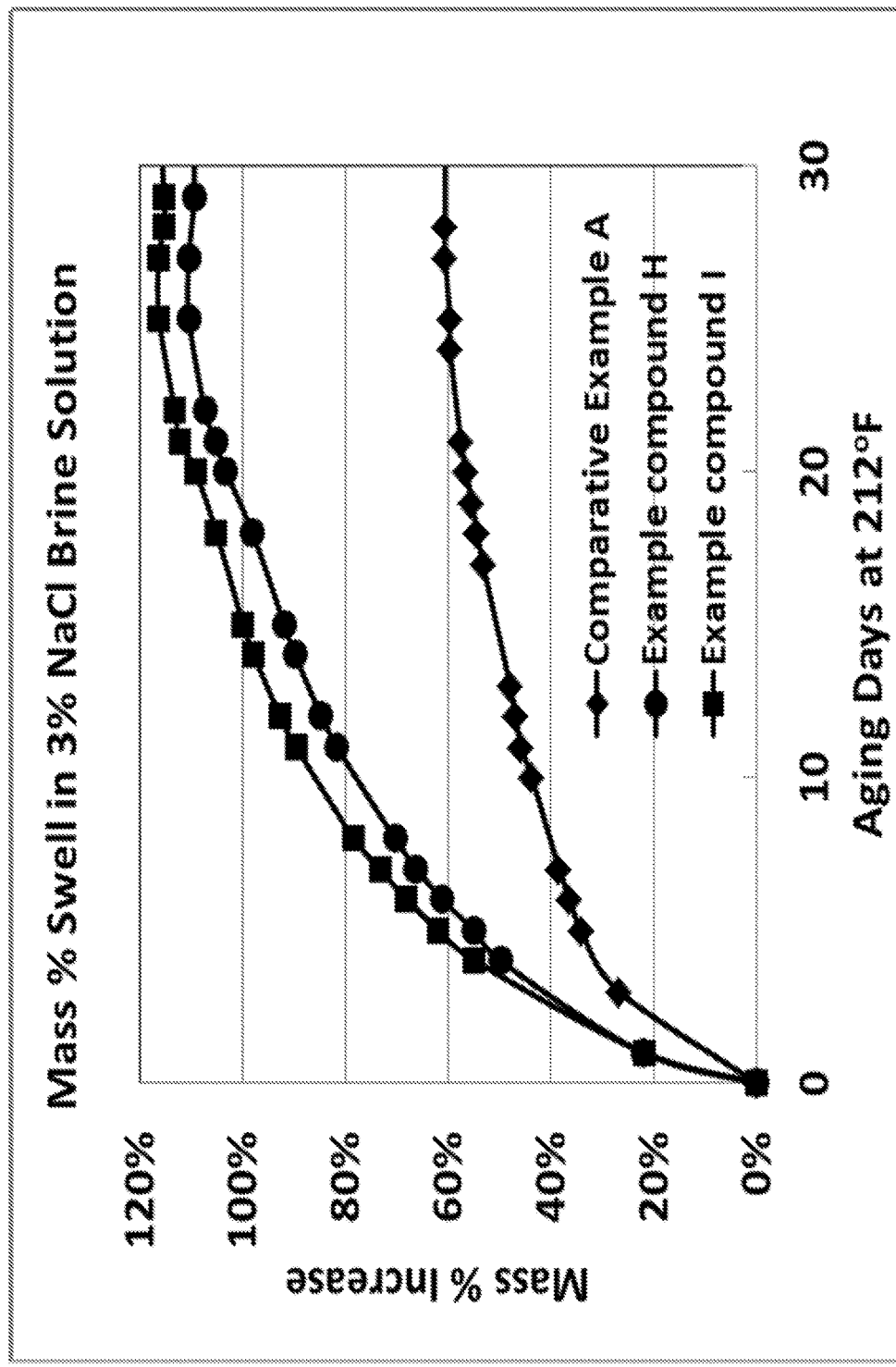
FIG. 4 depicts aged swelling data for comparative example Formula A and Formulas H and I of this invention in 3 wt. % NaCl brine solution.
Figure 5:
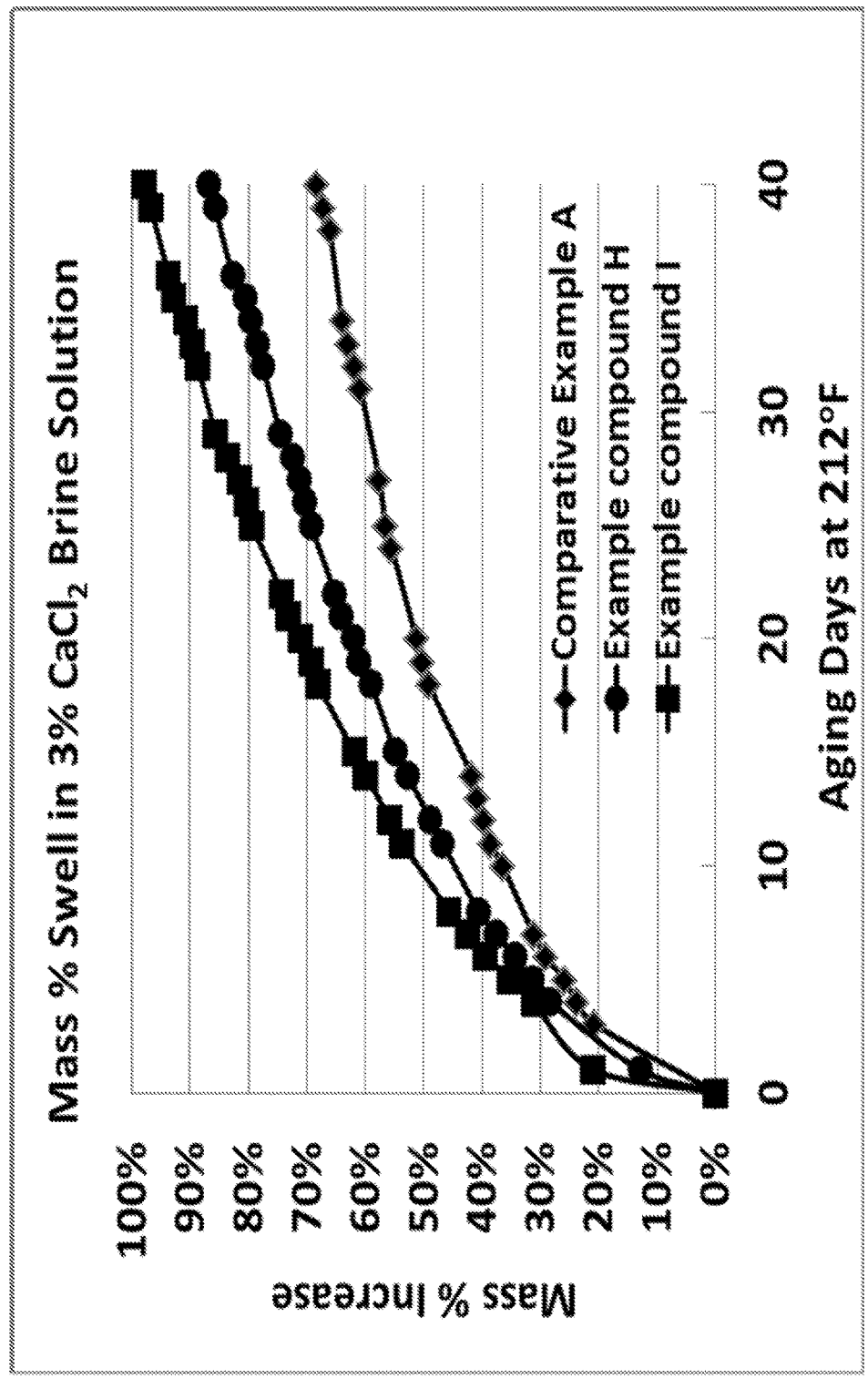
FIG. 5 depicts aged swelling data for comparative example Formula A and Formulas H and I of this invention in 3 wt. % $CaCl_2$ brine solution.

Referring now to FIGS. 4 and 5, the mass % swelling of the comparative example Formula A and Formulas H and I of this invention are shown for aging studies in a 3 wt. % NaCl brine solution and a 3 wt. % CaCl$_2$ brine solution. The data clearly shows that Formulas H and I have improved swelling compared to the comparative Formula A in both NaCl brines and CaCl$_2$ brine. Thus, swellable compositions including both an ionic cured network and a covalently cured network improve the swelling behavior of the composition both in water and in brines. These results are surprising in that the networks with mixed crosslinking system: ionic and covalent, out perform a composition having the level of covalent bonding.

CLOSING PARAGRAPH OF THE INVENTION

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:
1. An oilfield apparatus comprising:
a cured high temperature swellable elastomeric composition prepared from a composition comprising:
a crosslinkable elastomer or a mixture of crosslinkable elastomers,
a cure system adapted to covalently crosslink the elastomer(s),
a co-cure system adapted to form ionic crosslinks within the composition, where the co-cure system comprises a metal-containing poly-functional compound or a mixture of metal-containing poly-functional compounds, where the metal-containing poly-functional compounds are selected from the group consisting of di-functional metal acrylate compounds, di-functional metal methacrylate compounds, tri-functional metal acrylate compound, tri-functional metal methacrylate compounds, tetra-functional metal acrylate compounds, tetra-functional metal methacrylate compounds, penta-functional metal acrylate compounds, penta-functional metal methacrylate compounds, and mixtures thereof, where the metals are selected from the group consisting of alkaline earth metals, transition metals, lanthanide metals, actinide metals, metalloids and mixtures or combinations thereof,
an ionic additive system comprises metal-containing mono-functional organic compounds selected from the group consisting of sodium acrylate, potassium acrylate and mixture or combinations thereof, and
a superabsorbent polymer or a mixture of superabsorbent polymers,
where the cured high temperature swellable elastomeric composition comprises a swellable elastomeric network including covalent crosslinks, ionic crosslinks, and ionic domains, where the co-cure system and the ionic additive system form the ionic domains within the cured high temperature swellable elastomeric composition permitting improved water swellability without imparting significant stress/strain into the composition and permitting a faster rate of water osmosis into the composition and swelling of the composition, and where the cured high temperature swellable elastomeric composition is swellable in water and aqueous brines.

2. The apparatus of claim 1, wherein the elastomers are selected from the group consisting ofpolymers of ethylene-propylene diene monomer (EPDM), ethylene-propylene ruber (EPR), nitrile rubber (NBR), hydrogenated nitrile rubber (HNBR), carboxylated NBR, natural rubber, cis-polybutadiene, trans-polyisoprene, ethylene-octene-based rubber, fluorinated elastomers (FKM, FFKM, FEPM), styrene-butadiane rubber (SBR), hydrogenated styrene-butadiene rubber (hSBR), isoprene-butadiene rubber (IBR), hydrogenated isoprene-butadiene rubber (hIBR), styrene-isoprene rubber (SIR), hydrogenated styrene-isoprene rubber (hSIR), styrene-butadiene-isoprene (SIBR), hydrogenated styrene-butadiene-isoprene rubber (hSIBR), block, triblock and multi-block polymers of styrene-isoprene, styrene-butadiene, styrene-butadiene-isoprene thermoplastic elastomers, hydrogenated block, triblock and multi-block polymers of styrene-isoprene, styrene-butadiene, styrene-butadiene-isoprene thermoplastic elastomers, silicone rubbers, chlorosulfonated polyethylene (CSM), or mixtures and combinations thereof.

3. The apparatus of claim 1, wherein the cure system is selected from the group consisting of: a peroxide cure system, a sulfur cure system, a sulfur donor cure system, a radiation based cure system, and mixtures or combinations thereof.

4. The apparatus of claim 3, wherein the cure systems are of peroxides, sulfur, sulfur-donors, amines, phenolic resins, halogenated quinones, nitrobenzenes, metal oxides, irradiation source, bisphenol, any other crosslinking system that can generate free radicals, ions, or any other reactive sites on the molecular chain of elastomers, or mixtures and combinations thereof.

5. The apparatus of claim 4, wherein the organic peroxide is selected from the group consisting of dicumyl peroxide, tert-butyl cumyl peroxide, di-tert-butyl-peroxide, dibenzoyl peroxide, di(tertbutylperoxyisopropyl)benzene, di(2,4-dichlorobenzoyl) peroxide, di(4-methylbenzoyl) peroxide, 2,5-dimethyl-2,5-di(tert-butylperoxy)hexane, 2,5-dimethyl-2,5-di(tert-butylperoxy)hexyne, butyl 4,4-di(tert-butylperoxy)valerate, 1,1-di(tert-butylperoxy)-3,3,5-trimethylcyclohexane, tert-butyl peroxy-3,5,5-trimethylhexanoate, and tert-butyl peroxybenzoate.

6. The apparatus of claim 1, wherein cured elastomeric composition forms all or part of an oilfield element selected from the group consisting of submersible pump motor protector bags, packer elements, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

7. An oilfield assembly for exploring for, drilling for, testing for, or producing hydrocarbons comprising:
(a) one or more oilfield apparatus selected from the group consisting of tubing, jointed pipe, sucker rods, electric submersible pumps, submersible pump motor protector bags, packers, packer elements, blow out preventers, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof; and
(b) one or more of the oilfield apparatus comprising a cured elastomeric composition prepare from a composition comprising a crosslinkable elastomer or a mixture of crosslinkable elastomers, a cure system adapted to covalently crosslink the elastomers, a co-cure system adapted to ionically crosslink the elastomer(s) comprising a metal-containing poly-functional compound or a mixture of metal-containing poly-functional compounds, where the metal-containing poly-functional compounds are selected from the group consisting of di-functional metal acrylate compounds, di-functional metal methacrylate compounds, tri-functional metal acrylate compound, tri-functional metal methacrylate compounds, tetra-functional metal acrylate compounds, tetra-functional metal methacrylate compounds, penta-functional metal acrylate compounds, penta-functional metal methacrylate compounds, and mixtures thereof, where the metals are selected from the group consisting of alkaline earth metals, transition metals, lanthanide metals, actinide metals, metalloids and mixtures or combinations thereof, an ionic additive system comprises metal-containing mono-functional organic compounds selected from the group consisting of sodium acrylate, potassium acrylate and mixture or combinations thereof, where the cured high temperature swellable elastomeric composition comprises a polymer network including covalent crosslinks, ionic crosslinks, and ionic domains, and a superabsorbent polymer or a mixture of superabsorbent polymers, where ionic domains comprise the co-cure system and the ionic additive system and permit improved water swellability without imparting significant stress/strain into the composition and permit a faster rate of water osmosis into the composition and swelling of the composition, and where the cured high temperature swellable elastomeric composition is swellable in water and aqueous brines.

8. The assembly of claim 7, wherein the elastomers are selected from the group consisting of polymers of ethylene-propylene diene monomer (EPDM), ethylene-propylene ruber (EPR), nitrile rubber (NBR), hydrogenated nitrile rubber (HNBR), carboxylated NBR, natural rubber, cis-polybutadiene, trans-polyisoprene, ethylene-octene-based rubber, fluorinated elastomers (FKM, FFKM, FEPM), styrene-butadiane rubber (SBR), hydrogenated styrene-butadiene rubber (hSBR), isoprene-butadiene rubber (IBR), hydrogenated isoprene-butadiene rubber (hIBR), styrene-isoprene rubber (SIR), hydrogenated styrene-isoprene rubber (hSIR), styrene-butadiene-isoprene (SIBR), hydrogenated styrene-butadiene-isoprene rubber (hSIBR), block, triblock and multi-block polymers of styrene-isoprene, styrene-butadiene, styrene-butadiene-isoprene thermoplastic elastomers, hydrogenated block, triblock and multi-block polymers of styrene-isoprene, styrene-butadiene, styrene-butadiene-isoprene thermoplastic elastomers, silicone rubbers, chlorosulfonated polyethylene (CSM), or mixtures and combinations thereof.

9. The assembly of claim 7, wherein the cure system is selected from the group consisting of: a peroxide cure system, a sulfur cure system, a sulfur donor cure system, a radiation based cure system, and mixtures or combinations thereof.

10. The assembly of claim 9, wherein the cure systems are selected from the group consisting of peroxides, sulfur, sulfur-donors, amines, phenolic resins, halogenated quinones, nitrobenzenes, metal oxides, irradiation source, bisphenol, any other crosslinking system that can generate free radicals, ions, or any other reactive sites on the molecular chain of elastomers, or mixtures and combinations thereof.

11. The assembly of claim 10, wherein the organic peroxide is selected from the group consisting of dicumyl peroxide, tert-butyl cumyl peroxide, di-tert-butyl-peroxide, dibenzoyl peroxide, di(tertbutylperoxyisopropyl)benzene, di(2,4-dichlorobenzoyl) peroxide, di(4-methylbenzoyl) peroxide, 2,5-dimethyl-2,5-di(tert-butylperoxy)hexane, 2,5-dimethyl-2,5-di(tert-butylperoxy)hexyne, butyl 4,4-di(tert-butylperoxy)valerate, 1,1-di(tert-butylperoxy)-3,3,5-trimethylcyclohexane, tert-butyl peroxy-3,5,5-trimethylhexanoate, and tert-butyl peroxybenzoate.

12. The apparatus of claim 1, wherein the ionic domains are co-crosslinked into the composition.

13. The apparatus of claim 7, wherein the ionic domains are co-crosslinked into the composition.

* * * * *